United States Patent [19]

Takada

[11] 4,170,329
[45] Oct. 9, 1979

[54] EMERGENCY LOCKING VEHICLE SAFETY BELT RETRACTOR

[75] Inventor: Juichiro Takada, Tokyo, Japan

[73] Assignee: Takata Kojyo Co., Ltd., Tokyo, Japan

[21] Appl. No.: 847,374

[22] Filed: Oct. 31, 1977

[30] Foreign Application Priority Data

Nov. 18, 1976 [JP] Japan .......................... 51/153894[U]

[51] Int. Cl.² ...................... A62B 35/02; B65H 75/48
[52] U.S. Cl. .............................................. 242/107.4 B
[58] Field of Search ................ 242/107.4 R, 107.4 E, 242/107.3, 107.6, 107.7; 297/388; 280/744–747

[56] References Cited

U.S. PATENT DOCUMENTS

| | | | |
|---|---|---|---|
| 2,400,589 | 5/1946 | McArthur | 242/107.4 R |
| 2,650,655 | 9/1953 | Neahr et al. | 242/107.4 A |
| 2,696,249 | 12/1954 | Prokop et al. | 242/107.4 R X |
| 3,058,687 | 10/1962 | Bentley | 242/107.4 R |
| 3,335,974 | 8/1967 | Glauser et al. | 242/107.4 R |
| 3,343,763 | 9/1967 | Spouge | 242/107.4 R |
| 3,402,899 | 9/1968 | Wright et al. | 242/107.4 R |
| 3,405,953 | 10/1968 | Karlsson | 242/107.4 A X |
| 3,482,799 | 12/1969 | Wrighton et al. | 242/107.4 R |
| 3,495,786 | 2/1970 | Hemens | 242/107.4 R |
| 3,666,198 | 5/1972 | Neumann | 242/107.4 B |
| 3,907,227 | 9/1975 | Takada | 242/107.4 R |
| 4,093,145 | 6/1978 | Klink | 242/107.4 A |

*Primary Examiner*—Harvey C. Hornsby
*Assistant Examiner*—John M. Jillions
*Attorney, Agent, or Firm*—Wolder, Gross & Yavner

[57] ABSTRACT

An emergency locking safety belt retractor reel device includes a U-shaped bracket and a belt take-up reel rotatably supported between the side walls and spring biased to rotate in a belt retraction direction and including a shaft projecting beyond a side wall. A first circular brake member having annularly spaced brake openings is affixed to the shaft proximate the inside face of a side wall and a second brake member is axially movably mounted on the shaft proximate the side wall outer face and includes longitudinally projecting fingers movable through guide openings in the side wall into engagement with the brake reel openings to brake the reel and being spring retracted. A mechanism responsive to emergency conditions advances the second brake member which has openings with radial edges and the mechanism includes an internally toothed ratchet wheel rockable on the shaft and having inwardly projecting cam fingers engaging the second brake member radial edges, an inertia wheel rotatable on the shaft within the ratchet wheel and carrying a swingable pawl provided with a follower and a cam affixed to the shaft and engaged by the follower so that upon rapid belt extraction acceleration of the reel, the inertia wheel lags the cam in rotation to cam advance the pawl into engagement with the ratchet wheel to rock the latter which advances the second brake member to effect the locking of the first brake member and the reel.

7 Claims, 5 Drawing Figures

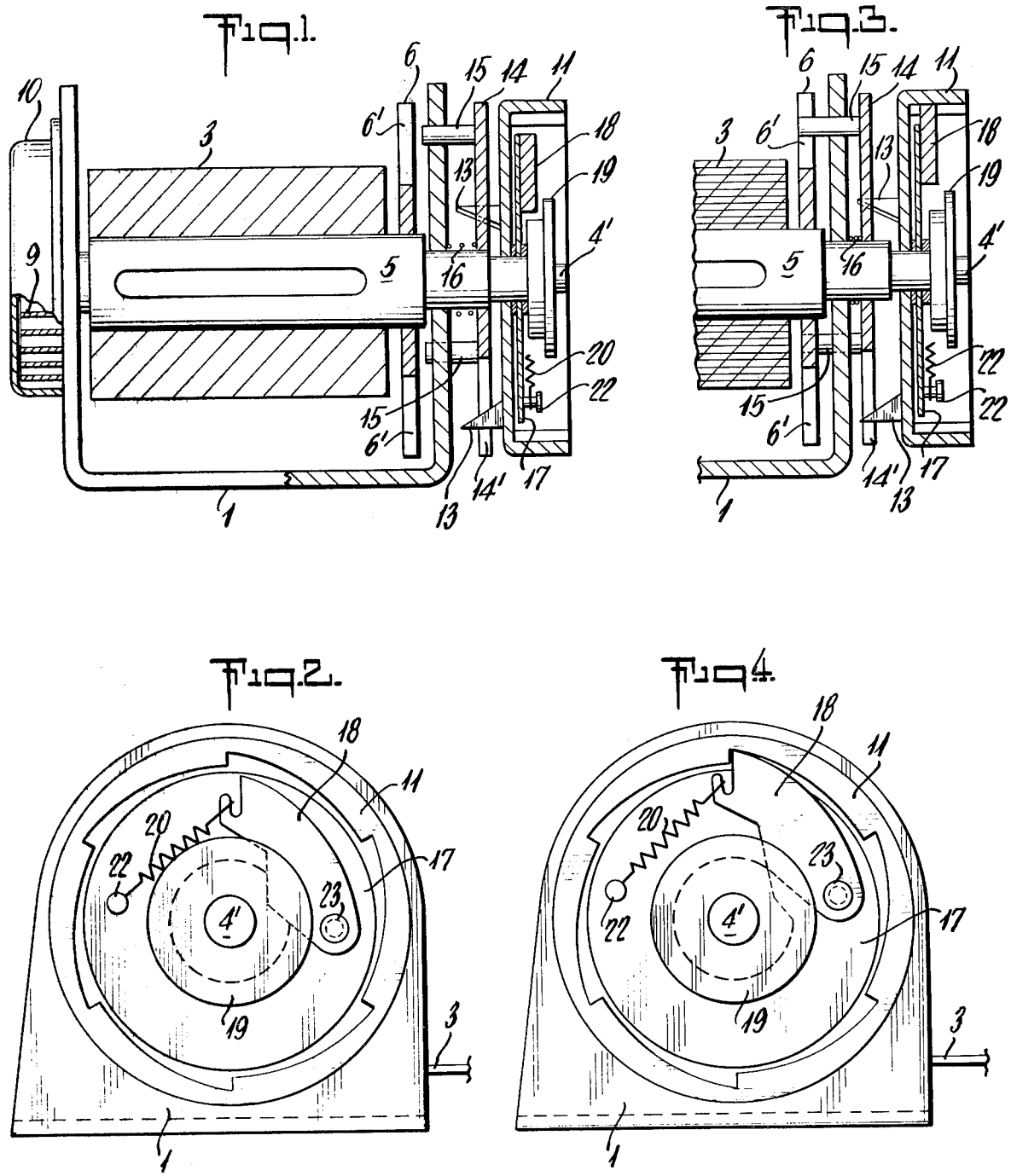

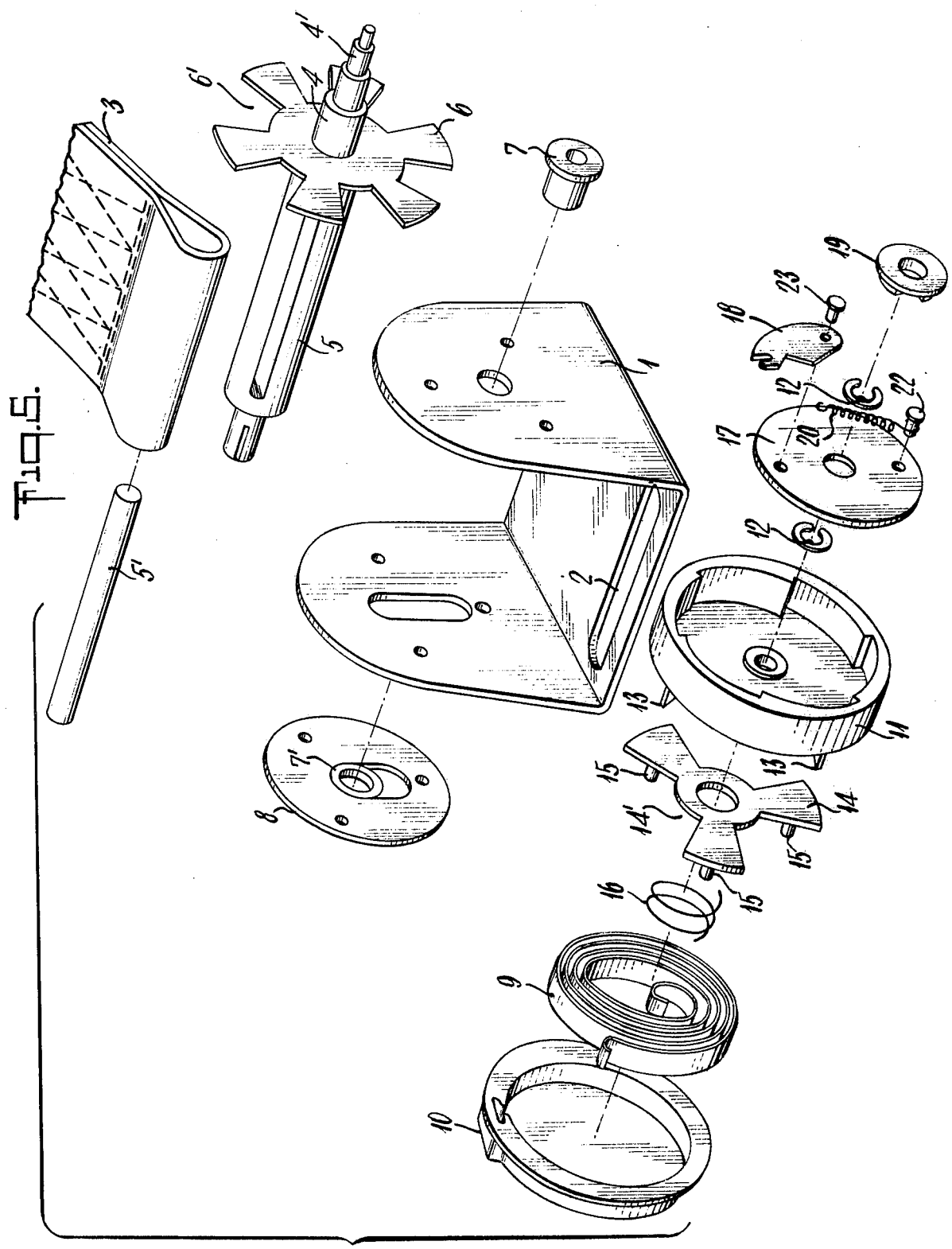

EMERGENCY LOCKING VEHICLE SAFETY BELT RETRACTOR

BACKGROUND OF THE INVENTION

The present invention relates generally to improvements in vehicle safety belt retraction devices, and it relates particularly to an improved automatic locking safety belt retractor reel which responds to a belt withdrawal exceeding a predetermined rate.

In order to restrain a vehicle seat occupant against forward motion in the event of a sharp or rapid slowing of the vehicle's forward motion, such as that accompanying a collision or similar occurrence while affording free and unhampered movement to the seat occupant, under normal vehicle conditions it is a common practice to take up the safety belt by a spring biased retractor reel which permits free withdrawal of the safety belt except under rapid vehicle deceleration conditions, under which conditions, the reel is automatically locked against belt withdrawal. One type of such reel responds to the belt withdrawal speed exceeding a predetermined rate to lock the reel against further withdrawal. While the reel may respond to any desired belt pull, it should advantageously respond to the pull exceeding 0.3 G. This type of reel which has been heretofore available possesses numerous drawbacks and disadvantages. They are complicated, bulky, expensive devices of limited application, difficult and inconvenient to install and of little versatility and adaptability.

SUMMARY OF THE INVENTION

It is a principal object of the present invention to provide an improved vehicle safety belt retractor.

Another object of the present invention is to provide an improved emergent locking vehicle safety belt retractor reel.

Still another object of the present invention is to provide a safety belt retraction reel which emergently locks against belt withdrawal when the belt is withdrawn under a pull exceeding a predetermined value.

A further object of the present invention is to provide a device of the above nature, characterized by its high reliability, great compactness, low cost, ease and convenience of installation, and great versatility and adaptability.

The above and other objects of the present invention will become apparent from a reading of the following description taken in conjunction with the accompanying drawings which illustrate a preferred embodiment thereof.

In a sense the present invention contemplates an improved emergency locking safety belt reel in a vehicle comprising a mounting bracket including a pair of opposite side plates, a take-up reel supported between said side plates and rotatable in opposite belt extraction and retraction directions and spring biased to rotate in a belt retraction direction, a safety belt anchored to said reel, a first brake member mounted on and rotatable with said reel proximate the inside face of a first of said bracket side plates and having an outwardly extending abutment shoulder, said first side plate having an opening therein radially offset from the axis of said reel, a second brake member including a braking element slideably engaging said opening and movable therealong between advanced and retracted positions respectively into and out of registry with the rotating locus of said shoulder, spring means normally urging said braking element to its retracted position, and brake actuating means responsive to an emergency condition of said vehicle for advancing said braking element into the rotational path of said shoulder. Advantageously, the braking member comprises a spoked circular plate having regularly spaced circumferentially spaced openings and the first side plate has such number of regularly circumferentially spaced openings each of which slideably engages a projecting brake element which is part of a common second brake member. The brake actuating means is advantageously responsive to the extraction acceleration of the reel exceeding a predetermined value, for example corresponding to an 0.3 G acceleration of the belt extraction.

In the preferred form of the present invention and as related to the drawings herein, the improved emergency locking safety belt retractor comprises: a U-frame 1 including slide plates, a take-up reel 5 rotatably supported between said die plates and including an axial shaft 4', a return spring 9 biased to rotate said reel in a belt rewind direction, a safety belt 3 taken up and retractable by and withdrawable from the take-up reel, a ratchet wheel 6 joined to and rotatable with the reel and having annularly spaced openings 6' therein, an inner toothed clutch wheel 11 mounted on and rotatable relative to the shaft and having longitudinal cam projections 13, a latch plate 14 having projections 15 on the inside face thereof rotatably mounted on the shaft and axially movable in response to the rotation of the toothed clutch wheel, an inertia wheel 17 freely rotatably mounted on the shaft, a pawl 18 mounted on the inertia wheel and rotatable therewith and swingable on the inertia wheel between advanced and retracted positions engaging and disengaging respectively the inner toothed clutch wheel, and a cam wheel 19 securely mounted on the shaft and rotatable therewith; whereby in the normal running of the vehicle, the reel, the cam wheel and the inertia wheel synchronously revolve together with the shaft, the inner toothed clutch wheel remaining non-revolving, the projections of the inner toothed clutch wheel being just engaged with the latch slots of latch plate without deep shifting toward latch slots, extraction and retraction of belt being substantially free depending on the occupant's intentional or non-intentional motion; and in an abnormal emergent case of the vehicle a sudden load of, for example, over 0.3 G applied by an accident such as the induced rapidly accelerating withdrawing of the belt, the time lagging revolving motion of the heavy inertia wheel relative to that of the cam wheel joined with the rapidly accelerating revolving shaft actuating the pawl to advance outwards by means of the cam portion of the pawl being driven by the relative revolution of the cam wheel to cause the tooth of the inner toothed clutch wheel to be engaged with an edge of the pawl and to have the clutch wheel started to be driven in a counterclockwise direction and the latch projections of the latch plate to thereby engage with the ratchet openings of the ratchet wheel by advancing through holes in a side wall of the U-frame to lock the ratchet wheel to prevent further extraction of the belt to result in restraining the impact motion of the occupant's body. In addition, the number of latch openings in the latch plate and the number of projections of the clutch wheel is just a half of the number of the ratchet teeth of the inner toothed clutch wheel and/or the openings of ratchet wheel.

The present improved retractor is rugged, simple, reliable, inexpensive and compact and is convenient to install even in restricted and limited spaces.

BRIEF DESCRIPTION OF THE DRAWINGS

FIG. 1 is a front and partially sectional view of a preferred embodiment of the present invention;

FIG. 2 is a right side elevation view thereof;

FIG. 3 is a partial sectional view similar to FIG. 1 showing the functional relations during emergency operatons;

FIG. 4 is a right side view under the conditions shown in FIG. 4; and

FIG. 5 is an exploded perspective view of the improved device.

DESCRIPTION OF THE PREFERRED EMBODIMENTS

Referring now to the drawings, which illustrate a preferred embodiment of the present device, the reference numeral 1 generally designates a U-shaped frame which includes a base wall and opposite side walls which frame constitutes the main supporting body of the present improved retractor device through a tranverse slot 2 in the bottom plate or bottom wall of which a belt 3 extends outward (such association not being shown) and the end of the belt webbing is secured to the vehicle body or a seat by means of a suitable anchor. The other end of the belt 3 is fixed on the reel center spindle 5' by means of a shaft 4 and longitudinally recessed reel 5 extending between the upright side walls of the frame 1. Located on the outside face of one side wall of the frame 1 are a retainer plate 8 having a medially located bearing 7', a spring cover 10, a shaft 4 integral with and extending from reel 5 through bearing 7', and a spiral shape return spring 9 is retained on cover 10 and is anchored there and to shaft 4. The rewinding spring biases or normally drives the reel 5 to rotate in a direction to retract and rewind the belt 3 wound on reel 5. A ratchet wheel 6 provided with preferably a plurality of regularly circumferentially spaced ratchet slots 6', is joined and secured to the other end of reel 5 at its junction with shaft 4 proximate the inside face of the other side wall of frame 1. A latch plate 14 having preferably a plurality of regularly circumferentially spaced latch slots 14' and longitudinally inwardly projecting latch sticks or fingers 15, is journalled to and freely longitudinally and rotatably movable on stepped shaft 4' which extends through bearing 7 outwardly beyond the side wall of said frame 1. The latch sticks 15 are arranged so as to longitudinally slidably project through corresponding holes provided in the respective side wall of frame 1. Further, outwardly of the latch plate 14 on the same section of shaft 4', an inner ratchet toothed clutch wheel 11 is journalled to freely move in both directions and restricted against axial movement by E-ring 12, which inner toothed clutch wheel is made of synthetic resin and is cup-shaped and provided with the same nubmer of inner ratchet teeth as the number of ratchet slots 6'. On the back or inner side of the toothed clutch wheel 11 are provided a plurality of inwardly longitudinally projecting projections 13, the number of which is the same as the number of the latch slots 14' and are arranged in engagement with the respective latch slots 14'. Furthermore, the projections 13 have inclined cam faces or edges, which faces are arranged so that said faces can slidably move in along the edges of the latch slots 14' and thereby longitudinally move said latch plate 14 toward the side wall of frame 1 against the bias or influence of a compression latch spring 16 entrapped between the confronting faces of the latch plate 14 and the respective side wall of the frame 1. The number of inner teeth of the inner toothed clutch wheel 11 and the number of the ratchet slots 6' are each respectively 6 in the present embodiment, but the number is not always limited to only six. The number of projections 13 of clutch wheel 11 and of latch slots 14' is respectively three in this case, but also three here is not the only number allowable. The preferable number of projections, however, is just a half of the number of inner ratchet teeth of the clutch wheel 11 or the number of ratchet slots 6'.

An inertia wheel 17, is freely rotatable on the shaft 4' within the inner toothed clutch wheel 11 and is prohibited by opposing E-ring 21 to shift freely back and forth. The inertia wheel 17 is provided with two small holes, in one of which is set a rivet 22 and in the other of which is set another rivet 23 which swingably supports a pawl 18. Such an arrangement permits the smooth and light swinging motion of said pawl 18 along the surface of inertia wheel 17.

One end of pawl 18 has a pawl which engages one end of a tension spring 20, the other end of which is connected to said rivet 22 on the inertia wheel. Normally, the pawl spring 20 urges the pawl into engagement with a proximate cam wheel 19 affixed to the outer end of stepped shaft 4' so that the pawl 18 is disengaged from the inner toothed clutch wheel 11. This situation is shown in FIG. 2. The cam wheel 19 is provided with a recessed portion therein in which the cam follower portion of the pawl 18 can fit in the ratchet wheel disengage position and in case of an emergency, when the inertia wheel 17 will revolve later than and lag the cam wheel 19, said recessed position of cam wheel 19 advances and a raised portion advances to push up the follower portion of said pawl 18 to swing pawl 18 outwardly into engagement with a tooth of inner toothed clutch wheel 11. The above described inertia mechanism is generally similar to the inertia mechanism disclosed in U.S. Pat. No. 3,897,024 granted to the present applicant and any other emergency responsive mechanisms having a similar function may of course be used instead. In such other cases, aligning adjustment during assembling of the mechanism will be required for synchronizing the action between the inner toothed clutch wheel 11 and the ratchet wheel 6.

Considering the operation of the device described above, under normal operation of the vehicle the safety seat belt is extracted and normal speed with little acceleration and reel 5, shaft 4, cam wheel 19 and inertia wheel 17 synchronously revolve together with shaft 4 without any relative lagging or leading in the respective rotations, but the inner toothed clutch wheel 11 remains stationary and cam projections 13 provided on the back side of the clutch wheel 11 remain stationary and coupled with latch slots space 14' as shown in FIG. 1 leaves latch plate 14 spring retracted outwardly away from side plate of the frame 1 so that latch sticks 15 are also retracted and uncoupled from respective slots spaces 6'. In such a condition, the safety belt webbing can be retracted and extracted without restriction with occupant's free body motion. However, in an emergency situation such as in a collision, the seat belt is sudddenly extracted with an acceleraton over a predetermined value caused by an acceleration value of more than 0.3 G applied to the belted occupant or belt, cam wheel 19 is rotated without any time lag by shaft 4. But as inertia wheel 17 is free to rotate relative to shaft 4 and possesses a high inertia, it starts to rotate later than the cam wheel, that is with a time lag. Then the cam rise portion of cam wheel 19 raises the follower portion of the pawl 18 on the inertia wheel 17 and so the pawl 18 is pushed outward against the influence of pawl spring 20 to result in engagement between the end edge of pawl 18 and a tooth of the inner toothed clutch wheel 11 as shown in FIG. 5 and finally the counterclockwise rocking of the clutch wheel 11 is effected. Consequently, the cam or inclined edge of projections 13 on clutch wheel 11 slidably engage the edge of latch slots 14' along the inclined faces of projections, as illustrated in FIG. 4 so as to advance latch plate 14 inwardly under the action of the projection cam edges and against the spring 16. Accordingly, advanced inwardly of the side wall of the frame 1 against the influence force of the latch spring 16 and engage the spaces of ratchet slots 6' of the ratchet wheel 6. Braking and prevention of any further belt extraction is thus effected to result in the reliable restraint of the seat occupant.

The earlier conventional emergency locking and winding mechanisms of the present type are usually provided with a complicated clutch mechanism to protect the sensor unit from excessive load application and prevent the incomplete locking at the time of operation. This results in deficiencies and errors in sensitivity and in an increased difficulty in producing a compact device. With the mechanism of the present invention, the device may be made highly compact due to the omission of the complicated clutch mechanism as used in the conventional device. Moreover, the various defects encountered in the conventional apparatus at the time of emergency are obviated without any reduction in the reliability of operation.

While there has been described and illustrated a preferred embodiment of the present invention, it is apparent that numerous alterations, additions and omissions may be made without departing from the spirit thereof.

I claim:

1. An emergency locking safety belt reel device comprising a bracket including side walls, a first of which has a plurality of annularly spaced guide openings therein, a belt take-up reel including a shaft extending between said side walls and projecting beyond said first side wall and rotatable with said reel in opposite belt extraction and retraction directions, spring means biasing said reel to rotate in a belt retraction direction, a first brake member affixed to said shaft proximate the inside face of said first side wall and having a plurality of annularly spaced locking openings formed therein, a second brake member slidably mounted on said shaft and located proximate the outside face of said first side wall and having a plurality of circumferentially spaced radially extending slots with radially extending follower edges and inlcuding a plurality of locking elements projecting therefrom into sliding engagement with respective guide openings in said first side wall and movable between an advanced position in the rotational paths of said locking openings and a retracted position outwardly thereof, spring means biasing said second brake member to its retracted position, and brake actuating means including a wheel rockably mounted on said shaft and means for rocking said wheel and cam fingers projecting from said wheel into engagement with said follower edges.

2. The reel device of claim 1 wherein the number of slots in the second brake member and the number of cam fingers on the actuating means wheel is each half the number of openings in the first brake member.

3. The reel device of claim 1 wherein said actuating means wheel comprises an internally toothed ratchet wheel, siad means for rocking siad wheel includes means for engaging the teeth of said ratchet wheel and the number of slots in the second brake member and the number of cam fingers on the ratchet wheel is each half the number of ratchet teeth on said ratchet wheel.

4. An emergency locking safety belt retractor comprising a U-frame including opposite side plates one of which has guide holes therein, a take-up reel rotatably mounted between said side plates and including a shaft, a return spring biasing said reel to rotate in a belt rewinding direction, a safety belt taken up to and retractable by and withdrawable from said take-up reel, a ratchet wheel affixed to and rotatable with said take-up reel, and having annularly spaced slots, an inner toothed clutch wheel mounted on and rotatable relative to said shaft, a latch plate having latch longitudinal projections on its inside face and coaxially rotatably mounted on said shaft and having a plurality of radial latch slots, an inertia wheel freely rotatably mounted on said shaft, a pawl mounted on said inertia wheel and rotatable therewith and swingably movable relative to said inertia wheel between two positions engaging and disengaging said inner toothed clutch wheel and including a cam follower, and a cam wheel securely mounted on and rotatable with said shaft and engageable by said follower, whereby under normal conditions, said reel, said cam wheel and said inertia wheel synchronously revolve together with said shaft and said inner toothed clutch wheel remains stationary, said inner toothed clutch wheel having projections shallowly engaging said latch slots of said latch plate, a rapid acceleration of the reel due to excessive acceleration extraction of the belt effects and the lagging rotation of said inertia wheel relative to that of said cam wheel to actuate said pawl outwardly into engagement with a ratchet tooth of said inner toothed clutch wheel to rock said clutch wheel in a predetermined direction, and at the same time, said latch projections of said latch plate engage with said ratchet slots of said ratchet wheel by penetrating through said guide holes in said side wall of said U-frame to lock said ratchet wheel to prevent further extraction of said belt to restrain the forward motion of the occupant.

5. A vehicle emergency locking safety belt reel device comprising a bracket including side walls, a first of which has a guide opening therein, a belt take-up reel including a shaft extending between said side wall and rotatable with said reel in opposite belt extraction and retraction directions, spring means biasing said reel to rotate in a belt retraction direction, a first brake member affixed to said shaft proximate the inside face of said first side wall and having at least one locking opening formed therein, a second brake member located proximate the outside face of said first side wall and including a locking element projecting therefrom into sliding engagement with said guide opening and movable between an advanced position in the rotational path of said locking opening and a retracted position outwardly thereof, spring means biasing said second brake member to its retracted position, and brake actuating means responsive to a predetermined condition of the rate of rotation of said reel for advancing said locking element to brake said reel.

6. The reel device of claim 5 wherein said actuating device is responsive to the protraction rotation of said reel exceeding a predetermined acceleration.

7. The reel device of claim 6 wherein said second brake member includes a disc slidably mounted on said shaft and having a plurality of circumferentially spaced radially extending slots with radial follower edges and said actuating means comprises an internally toothed ratchet wheel rockable on said shaft outside said second brake member and including at least one cam finger projecting into sliding engagement with a corresponding follower edge whereby rotation of said ratchet wheel in a predetermined direction effects the longitudinal advance of said second brake member, an inertia wheel rotatable on said shaft within said ratchet wheel, a pawl mounted on said inertia wheel and swingable between an advanced position engaging said ratchet wheel and a retracted position and spring biased to a retracted position and including a cam follower section and a cam affixed to said shaft and engaged by said follower section whereby lagging rotation of said inertia wheel effects the advance of said pawl by said cam into engagement with said ratchet wheel to rock said ratchet wheel.

* * * * *